(12) United States Patent
Murakami et al.

(10) Patent No.: US 7,483,829 B2
(45) Date of Patent: Jan. 27, 2009

(54) CANDIDATE SYNONYM SUPPORT DEVICE FOR GENERATING CANDIDATE SYNONYMS THAT CAN HANDLE ABBREVIATIONS, MISPELLINGS, AND THE LIKE

(75) Inventors: Akiko Murakami, Yokohama (JP); Hirofumi Matsuzawa, Sagamihara (JP); Tetsuya Nasukawa, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 34 days.

(21) Appl. No.: 10/484,333

(22) PCT Filed: Jul. 19, 2002

(86) PCT No.: PCT/JP02/07370

§ 371 (c)(1),
(2), (4) Date: Jan. 21, 2004

(87) PCT Pub. No.: WO03/012679

PCT Pub. Date: Feb. 13, 2003

(65) Prior Publication Data

US 2004/0181759 A1    Sep. 16, 2004

(30) Foreign Application Priority Data

Jul. 26, 2001 (JP) ............... 2001-226830

(51) Int. Cl.
G06F 17/27 (2006.01)
G06F 17/20 (2006.01)
G06F 7/00 (2006.01)

(52) U.S. Cl. ............... 704/10; 704/9; 707/1; 707/104.1

(58) Field of Classification Search ............... 707/6; 715/530–537; 704/4–9
See application file for complete search history.

(56) References Cited

U.S. PATENT DOCUMENTS 4,773,039 A * 9/1988 Zamora ............... 715/540
5,469,355 A * 11/1995 Tsuzuki ............... 704/9
5,675,819 A    10/1997 Schuetze
5,742,834 A * 4/1998 Kobayashi ............... 704/10
5,963,940 A    10/1999 Liddy et al.

FOREIGN PATENT DOCUMENTS

WO     00/73936 A1    12/2000

OTHER PUBLICATIONS

Nagano et. al. "Customer Claim Mining: Discovering knowledge in vast amounts of textual data" IBM Research, Tokyo Research Laboratory. May 24, 1999. pp. 1-16.*

(Continued)

Primary Examiner—John R. Cottingham
Assistant Examiner—Michael Pham

(57) ABSTRACT

A candidate synonym acquisition device acquires a set of candidate synonyms similar to an input word for each writer from data for each writer, and acquires a set of candidate synonyms similar to the input word from a collective data. A generated candidate synonym set is inputted to a candidate synonym determination device to evaluate the candidate synonyms of the collective data. In the evaluation, the status of "absolute" is given to a word matching a word ranked first in the candidate synonyms for each writer and the status of "negative" is given to words matching words ranked second and lower therein.

13 Claims, 8 Drawing Sheets

OTHER PUBLICATIONS

Murakami et al., "Term Aggregation: Mining Synonymous Expressions using Personal Stylistic Variations", Proceedings of the 20th International Conference on Computational Linguistics, 2004, Switzerland.

Park et al., "Automatic Thesaurus Construction Using Bayesian Networks", Information Processing & Management, 1996, 543-553, vol. 32, No. 5, Elsevier Sciene Ltd., Great Britain.

Nasukawa et al., "Base Technology of Text Mining", Journal of Japanese Cociety for Artificial Intelligence, vol. 16, No. 2, p. 201-211, published Mar. 2001.

Nasukawa et al., "Text Mining Application for Call Centers", Journal of Japanese Society for Artificial Intelligence, vol. 16, No. 2, p. 219-225, published Mar. 2001.

Maekawa et al., "Determining Word Senses Using Syntactical Relation and Mutual Information", IPSJ SIG Notes, vol. 98, No. 21, p. 55-62, Abstract only of 1998 publication.

Tateishi et al., "Opinion Information Retrieval From the Internet", IEICE Technical Report vol. 101, No. 189, p. 75-82, Abstract only of 2001 publication.

Tateishi et al., "Opinion Information Retrieval From the Internet", IPSG SIG Notes vol. 2001, No. 69, p. 75-82, Abstract only of 2001 publication.

* cited by examiner

CANDIDATE SYNONYM SUPPORT DEVICE FOR GENERATING CANDIDATE SYNONYMS THAT CAN HANDLE ABBREVIATIONS, MISPELLINGS, AND THE LIKE

This application is a national stage application of and claims priority from PCT Application PCT/JP02/07370, filed Jul. 19, 2002, which claims priority from Japanese Application 2001-226830, filed Jul. 26, 2001. These disclosures are hereby incorporated by reference herein in their entireties.

TECHNICAL FIELD

The present invention relates to a data processing method, a data processing system, and a program. More specifically, the present invention relates to a technology which handles a large amount of document data as a corpus and which is effective when the technology is applied to high-accuracy generation of candidate synonyms for a word appearing in a document.

BACKGROUND

Against backdrops of the price-reduction and generalization of information processing systems, the generalization of document creation tools including word processors, and the recent progress of network environments including the Internet, a huge amount of electronic data is being accumulated. For example, all kinds of information, such as various in-house documents including sales reports and reports of conversations with customers in call centers, is being accumulated as electronic data in information processing systems.

In general, the accumulation of such information is intended to extract useful knowledge usable in corporate activities, operating activities, and the like. For example, the knowledge is about product sales trends, customer trends, complaints and requests about quality or the like, the early detection of faults, and the like. In order to obtain such useful knowledge from raw information, the raw information needs to be analyzed from some viewpoint. In the case where the raw information is previously labeled with classifications or the like, analysis is relatively easy. However, the knowledge capable of being obtained from documents classified by item based on an already conceived viewpoint does not go much beyond the viewpoint. That is, new knowledge not capable of being conceived in advance is often extracted from unclassified free-form descriptions. Therefore, what is needed is a method for analyzing raw information based on a document recorded in a free-form from a liberal viewpoint, for example, what the topic of the document is, how the time series trend of the topic is, or the like.

One of such methods is text mining in which a large amount of text data is processed and analyzed. For example, an analysis tool which makes it possible to use, as an analysis object, a wide variety of contents described in a large amount of document data and which utilizes a text mining technique for extracting and providing the correlations and appearance trends thereof is described in Tetsuya Nasukawa, Masayuki Morohashi, and Tohru Nagano, "Text Mining—Discovering Knowledge in Vast Amounts of Textual Data—," Magazine of Information Processing Society of Japan, Vol. 40, No. 4, pp. 358-364 (1999). The use of such a method (tool) makes it possible for a person to discover useful knowledge by automatically analyzing a huge number of raw documents without reading all of the raw documents.

In text mining, what meaning (positive or negative, or a question or a request) a concept (topic) described in a document or a given topic (concept) is given is focused on. Accordingly, it is necessary to extract not a word as represented in the document but an appropriate concept to perform analysis for each concept. That is, it is necessary not only to merely automatically handle a word represented in the document but also to appropriately grasp the concept meant by the word.

When such a concept is extracted from a written word, the handling of synonyms or homographs of the word becomes a problem. Specifically, in the case where the concept meant by a word represented by one notation is represented by other notations, a group of the words meaning the same concept must be handled as synonyms. If words are regarded as different words when the words are synonymous but represented by different notations, the frequency of the concept meant by the different words is not correctly counted, and the document may not be analyzed properly. Moreover, there are cases where words represented by the same notation mean different concepts depending on fields or situations where the words are used. For example, the word "driver" means software for running a device if the word is a computer-related word, but means a driving person if the word is an automobile-related word. When words represented by the same notation mean different concepts, if the words are not accurately distinguished to be grasped, the proper frequencies of the concepts are not counted similarly to the above, thus making correct analysis of the document difficult.

Accordingly, for the problem of synonyms, words have been unified into the same representation using an existing thesaurus such as the EDR dictionary or a synonym table conventionally. The EDR dictionary is a dictionary of 200 thousand words for each of Japanese and English, which contains a word dictionary, a cooccurrence dictionary, and a concept dictionary, and is described at, for example, http://www.iijnet.or.jp/edr/J_index.html." On the other hand, it is possible to solve the problem of homographs by adding differences of meanings as comments to words. However, this method requires a very high cost in processing a large number of documents and therefore has low feasibility. Accordingly, in the case where documents in a fixed field are analyzed, meanings appropriate for the field are assigned to homographs and the homographs are handled by being assumed to be synonymous with the word of the meanings, thereby solving this problem. In order to achieve this, creating a dictionary for each field is essential.

Incidentally, about a method for extracting synonyms from a corpus (large amount of document data), the following researches have been known. For example, a research for finding degrees of relatedness between nouns using cooccurrence data of verbs and nouns, such as subjects and objects, is described in Donald Hindle, "Noun Classification From Predicate-Argument Structures," Proc. 28th Annual Meeting of ACL, pp. 268-275 (1990). This research can be applied to a method for extracting, as synonyms, nouns having high degrees of relatedness with an object noun. Moreover, a research for finding degrees of relatedness between nouns using not cooccurrence relations but dependency relations with verbs and adjectives to check the magnitude relation of abstraction level for the nouns is described in Tomek Strzalkowski and Barbara Vauthey, "Information Retrieval Using Robust Natural Language Processing," Proc. 30th Annual Meeting of ACL, pp. 104-111 (1992). Furthermore, a research for extracting changeable relations between words using grammar information in a corpus is described in Naohiko Uramoto, "Improving the ratio of applying cases using changeable relations to the elimination of ambiguities of sentences," Journal of the Japanese Society for Artificial Intelligence, Vol. 10, No. 2, pp. 242-249 (1995). The above-described researches can be also utilized for checking degrees of relatedness between nouns.

For synonyms and homographs, which become problems in adopting a text mining technique, the above-described solutions are prepared tentatively. However, the present inventors recognize that there is another problem as follows. Specifically, the problem is about differences of notations due to abbreviations, misspelling, and the like.

In general, most text data used in text mining is created by a plurality of persons, for example, in-house documents, records or the like of questions received in a call center, and the like. In such documents created by a plurality of persons, word notations are not unified, and abbreviations or the like tend to be frequently used because the documents are relatively informal documents. For example, in a call center, a word "customer" is frequently used. This is sometimes written as "cus" or "cust" depending on recording persons. It can be hardly expected that abbreviations are included in dictionaries. Accordingly, if synonyms are generated using an existing dictionary, all of such abbreviations are handled as unknown words. If abbreviations are handled as unknown words, the abbreviations are handled as not words having intrinsic meanings but other words. The abbreviations are also not counted in frequencies of original words, and discarded as noises because the number of the abbreviations is small. Moreover, in such in-house documents and the like, words are often misspelled when the words are inputted to computers. In particular, in records in a call center or the like, since documents need to be created within a limited time, typos are often generated. Documents containing such misspellings are also handled as meaningless noises similarly to the above.

However, the more frequently words are used, the highest the possibility that the words are abbreviated is. Whereas, there are many cases where concepts related to words are important because the words are ones frequently appearing. Moreover, in general, documents created in departments directly facing customers have high possibility of containing misspellings because creation times are limited as the example of the call center. Whereas, such documents created in departments directly facing customers have high possibility of recording useful customer information and containing important knowledge to companies. That is, there is great significance in handling words, which are not given in dictionaries, such as abbreviated words and misspelled words as meaningful data. Note that the case where a double-byte character of Japanese, Chinese, Korean, or the like is misconverted by a front-end processor (FEP) is handled similarly to the case of misspelling.

Accordingly, it is necessary to create a dictionary in consideration of abbreviations, misspellings (including misconversion), and the like. Since an existing dictionary does not cover all of abbreviations and misspellings, a dictionary necessary for text mining must be created by humans. This is a task requiring a very high cost and a part which users are most concerned about in an actual operation of text mining. Therefore, a support system for creating a dictionary, which automatically generates synonyms for creating a thesaurus, is needed.

As a method for automatically generating synonyms, the aforementioned researches of Literatures 2 to 4 can be utilized. Specifically, degrees of relatedness between nouns are found by the methods of the aforementioned researches, and nouns within a predetermined range, which have high degrees of relatedness, are set as synonyms. However, if these methods are used, there is a problem that antonyms are acquired in addition to the synonyms. That is, if a conventional method is adopted as it is, many noises including antonyms and others are acquired, whereby the removal of the noises by humans becomes complex.

Further, in fields significantly progressing, such as the computer field, new words are generated one after another. These new words need to be rapidly and appropriately handled in text mining.

SUMMARY

An object of the present invention is to provide a support system or a method for generating candidate synonyms, in which candidate synonyms can be generated efficiently when a thesaurus usable in text mining is created. Moreover, another object of the present invention is to make it possible to handle words including abbreviations and peculiar terms used in a document to which text mining is actually applied, and even misspelled or misconverted words, by using the document, in generating the candidate synonyms. Furthermore, still another object of the present invention is to provide a system capable of dynamically generating an optimum thesaurus for a document to which the thesaurus is to be applied, by using this system with a system for text mining, to realize more accurate document analysis.

The outline of the invention of the present application is described as follows. Specifically, a data processing method of the present invention is a data processing method for generating a candidate synonym for an object word used in document data, the data processing method including the steps of: generating a first set of candidate synonyms for the object word, based on whole of the document data; generating at least one second set of candidate synonyms for the object word, based on at least one part of the document data; and narrowing the candidate synonyms contained in the first set using the candidate synonyms contained in the second set. In the narrowing step, whether the candidate synonyms in the second set are appropriate synonyms of the object word is determined according to a predetermined criterion, and words matching words in the second set which have not been determined to be the synonyms are removed from the candidate synonyms in the first set unless the words have been determined to be the synonyms within the part in any second set, thereby generating the candidate synonym.

Specifically, when the candidate synonyms of the object word are generated, the document data itself in which the object word is used is utilized as a corpus, thus extracting or preparing the partial data (part of the document data), which is a subset of the corpus. As the partial data, data in which the object word can be identified or estimated to be represented by a specific synonym is prepared. Then, an existing processing of generating candidate synonyms is performed on the whole of the document data. The candidate synonyms (first set) generated by this processing include noises (antonyms and other words which are not synonyms) which are originally not synonyms but slip in because the degrees of relatedness thereof are ranked high by the processing of generating candidates, in addition to synonyms which are correct answers. On the other hand, the partial data is handled as a corpus, and a similar processing is performed on this partial corpus. These candidate synonyms (second set) for the partial data also include noises in addition to synonyms similarly to the processing performed on the whole of the document data. Here, since a candidate synonym which is already identified or estimated to be a correct answer must exist among the candidate synonyms contained in the second set, this is set as a definitive candidate synonym. On the other hand, except the definitive candidate synonym, the candidate synonyms in the second set are regarded as noises. Using this information, the candidate synonyms of the first set can be narrowed. Specifically, as long as the same processing of generating candidate synonyms is adopted, similar noises are contained in the first and second sets. Noises are estimated by evaluating the second set, and the noises of the first set are canceled using the noises of the second set. In this way, the ratio of correct answers in the first set can be improved.

Thus, in the present invention, partial data is prepared which contains, without a bias, words and the relations thereof causing noises and which contains an original word of the definitive candidate synonym and the relation thereof so that the definitive candidate synonym may be certainly ranked high. The point of improving the ratio of correct answers in the first set is how properly such partial data is generated or prepared. In the present invention, as an example of such partial data (part of the document data), document data containing only sentences created by a specific writer is taken. Specifically, the present inventors recognize the fact that a specific writer tends to frequently use a specific notation when the specific writer writes a given concept, and the present invention has been achieved based on such knowledge. For example, it is possible to use, as a word meaning a customer in English notation, "customer" and "Cust" which is an abbreviation thereof, "EU" which is an abbreviation of "End User," and the like. Actually, in document data analyzed by the present inventors, these notations of "customer," "Cust," "EU," and the like are mixed as notations meaning a customer. However, when respective documents created by specific writers are focused on, a certain writer mainly writes "customer," another writer mainly writes "Cust," and still another writer mainly writes "EU" or the like. That is, if documents are analyzed for each writer, the writer tends to represent a given concept using a notation unique to the writer and has a small probability of representing the same concept with other notations. The internal structure of such document data for each writer is a structure in which the concept represented by the object word is represented by a specific synonym (including the object word) in the partial data. Moreover, the partial data for each writer contains therein a document structure causing noises similarly to the whole of the document data. Therefore, the document data for each writer is used as the partial data (part of the document data), and proper noises are detected, thereby narrowing the candidate synonyms in the first set.

Incidentally, in the above-described data processing method, the predetermined criterion may be a degree of relatedness, and the word determined to be the specific synonym may be the candidate synonym having the highest degree of relatedness with the object word in the second set. For example, in the case where the document data for each writer is adopted as the partial data, many writers write a given concept with a single notation (word). In this case, it is suitable that the word ranked highest is set as a word capable of being regarded as a synonym.

Furthermore, the data processing method of the present invention is a data processing method based on document data containing sentences by different writers for generating a candidate synonym for an object word used in the document data the data processing method including the steps of: generating or preparing at least one piece of partial data of the document data for each writer, the partial data containing only the sentences by the single writer; extracting words contained in the document data, calculating degrees of relatedness between the extracted words and the object word, and generating a first set of candidate synonyms which has, as elements thereof, a predetermined number of the extracted words ranked highest in descending order of the degree of relatedness; extracting words contained in the partial data, calculating degrees of relatedness between the extracted words and the object word, and generating a second set of candidate synonyms for each writer which has, as elements thereof, a predetermined number of the extracted words ranked highest in descending order of the degree of relatedness; evaluating, among the words contained in the first set, the words matching the words ranked in places equal to or higher than a threshold value place in any of the second sets to be "absolute"; evaluating, among the words contained in the first set except the words evaluated to be "absolute," the words matching the words ranked in places lower than the threshold value place in any of the second sets, to be "negative"; and generating the candidate synonyms for the object word from the words of the first set except the words evaluated to be "negative."

According to such a data processing method, the candidate synonyms of the first set can be narrowed with the candidate synonyms of the second sets similarly to the aforementioned method. In this case, the candidates which are ranked in places equal to or higher than a threshold value place in the second sets are evaluated to be "absolute." The candidate synonyms evaluated to be "absolute" are almost regarded as synonyms. The other words are regarded as noises to be deleted from the first set, thereby making it possible to generate candidate synonyms with high accuracy. Here, the threshold value place can be defined as follows. Specifically, when the candidate synonyms ranked n-th and higher in a ranking-added result of synonyms obtained from data for each person are evaluated to be "absolute" in the set of synonyms obtained from the collective data, the n-th place is set as the "threshold value place." If the threshold place is set high, the probability that synonyms which should be originally included in candidate synonyms is dropped out of the candidate synonyms to be obtained becomes high. On the other hand, if the threshold value place is set low, the probability that noises are contained in the candidate synonyms to be obtained becomes high. Therefore, an experientially preferable place should be employed as the threshold place in accordance with the structure of the partial data and the number of pieces of the partial data.

Note that the threshold value place may be the first place. For example, when data for each person is employed as the partial data, the fact that each person shows a strong tendency to use one specific representation when the person writes a given concept has been described previously. In such a case, if the threshold value place is set to the first place, the probability that noises are contained in the generated candidate synonyms becomes small.

Moreover, the calculation of the degrees of relatedness can be realized by the steps of: extracting all words of a first word class and all words (basic independent words) of a second word class from the document data or the partial data, the words of the second word class having modification relations with the words of the first word class; generating a matrix using all the extracted words of the first word class and the second class as indices of rows or columns thereof, the matrix having a size of the number of the words of the first word class multiplied by the number of the words of the second word class; substituting a frequency of the modification relation between the words of the first word class and the second word class indexing each element of the matrix into the element; extracting each element of the row or column having, as the index, the word of the first word class matching the object word from the matrix generated based on the document data to set the row or column, as an object word vector; extracting each element of an arbitrary row or an arbitrary column from the matrix generated based on the document data or the partial data, to set the row or column as a vector of the word of the first word class indicated by the row or column; and calculating the degree of relatedness of the word of the first word class with the object word using the vector of the word of the first word class and the object word vector. Specifically, the degrees of relatedness can be calculated based on the frequencies of cooccurrence and the frequencies of dependency relations between the words of the first word class and the second word class in documents. Note that a method using the scalar product value of the object word vector and the vectors of the words of the first word class is taken as an example of the calculation of the degrees of relatedness.

Incidentally, when the object word vector and the vectors of the words of the first word class are generated by extracting each element of any of rows or columns from the matrix, if the object word vector is generated by extracting each element of a row, of course, the vectors of the words of the first word class are generated by similarly extracting each element of a row. On the other hand, if the object word vector is generated by extracting each element of a column, the vectors of the words of the first word class are generated by similarly extracting each element of a column. Further, it is also possible to perform the calculation in the state where row vectors and column vectors are replaced with each other, using a transpose.

Here, the words of the first word class may be nouns, and the words of the second word class may be verbs, adjectives, adjectival verbals, and others which can have modification relations with the nouns. In this case, the degrees of relatedness between the nouns can be found using the frequencies of cooccurrence and the frequencies of dependency relations with the verbs and the like. Note that it is also possible to select verbs and the like as the words of the first word class and nouns as the words of the second word class. In this case, the degrees of relatedness between verbs and the like can be calculated. That is, words other than nouns, i.e., verbs and the like, can be also selected as the object word.

Moreover, in the case where a part created by use of a document template is contained in the document data or the partial data, the part created by use of the document template can be deleted from the document data or the partial data. This prevents representations unified by templates and the like from being mixed into the document data for each writer. For example, in the case where a report of a conversation in a call center is created, speed is required in entering a document. In such a place where entry speed is required, a typical representation is prepared as a template for simplifying entry work. Call takers can perform entry work with easy operations using the template. If such a template is used, created documents contain unified representations without dependence on writers. If these unified representations are mixed in documents for each writer, representations for each writer (synonym representations unique to each writer) cannot be correctly evaluated. Therefore, words due to these unified representations are excluded in advance.

Further, in the case where a series of sentences or documents about the same or similar topics is contained in the document data or the partial data, the frequencies of the words can be normalized for each sentence or each document. Specifically, there are cases where a transaction for a given topic occurs, for example, a given question, an answer thereto, a further question, an answer thereto, and the like. In such a case, the frequencies of words related to a given question (topic) become high. On the other hand, there are also cases where a problem (question) of similar contents is solved with few answers. In the case where a document when there is a transaction and a document completed with a short answer exist in the same document data, words appearing in a topic having a high frequency or the modifications involving the words are weighed heavily, and words or the like appearing in a topic completed with a relatively short answer are evaluated lightly. Accordingly, in order to properly retrieve words and the modifications involving the words to evaluate the characteristics of a noun, when such a transaction occurs, it is preferred to normalize the frequencies of words appearing in the transaction. The above is intended to respond to such a request.

In addition, in the case where the frequency of a noun appearing in the document data or the partial data is lower than a predetermined frequency, the noun can be removed from objects of the calculation of the degrees of relatedness. Since words having low frequencies sometimes cause noises, such words are removed in advance.

Incidentally, the object word may be a term selected from a document in which unified representations are used, such as a manual, a dictionary, or the like. There is an empirical rule that the ratio of correct answers is improved when the candidate synonyms are generated by setting a general term as the object word. Accordingly, the ratio of correct answers in generating the candidate synonyms can be improved by using a general term.

In the present specification, the word "synonym" also includes words which may be regarded as synonyms in text mining. Specifically, words representing the same concept when the words are applied to text mining are included in synonyms, even if the words cannot be precisely regarded as synonyms linguistically. Therefore, misspelled words, abbreviations, and words misconverted by an FEP, which represent a concept equivalent to that of an object word, can be synonyms. Further, the inventions of the aforementioned methods can be grasped as an invention of a system or a program.

THE FIGURES

DETAILED DESCRIPTION

Figure 1:
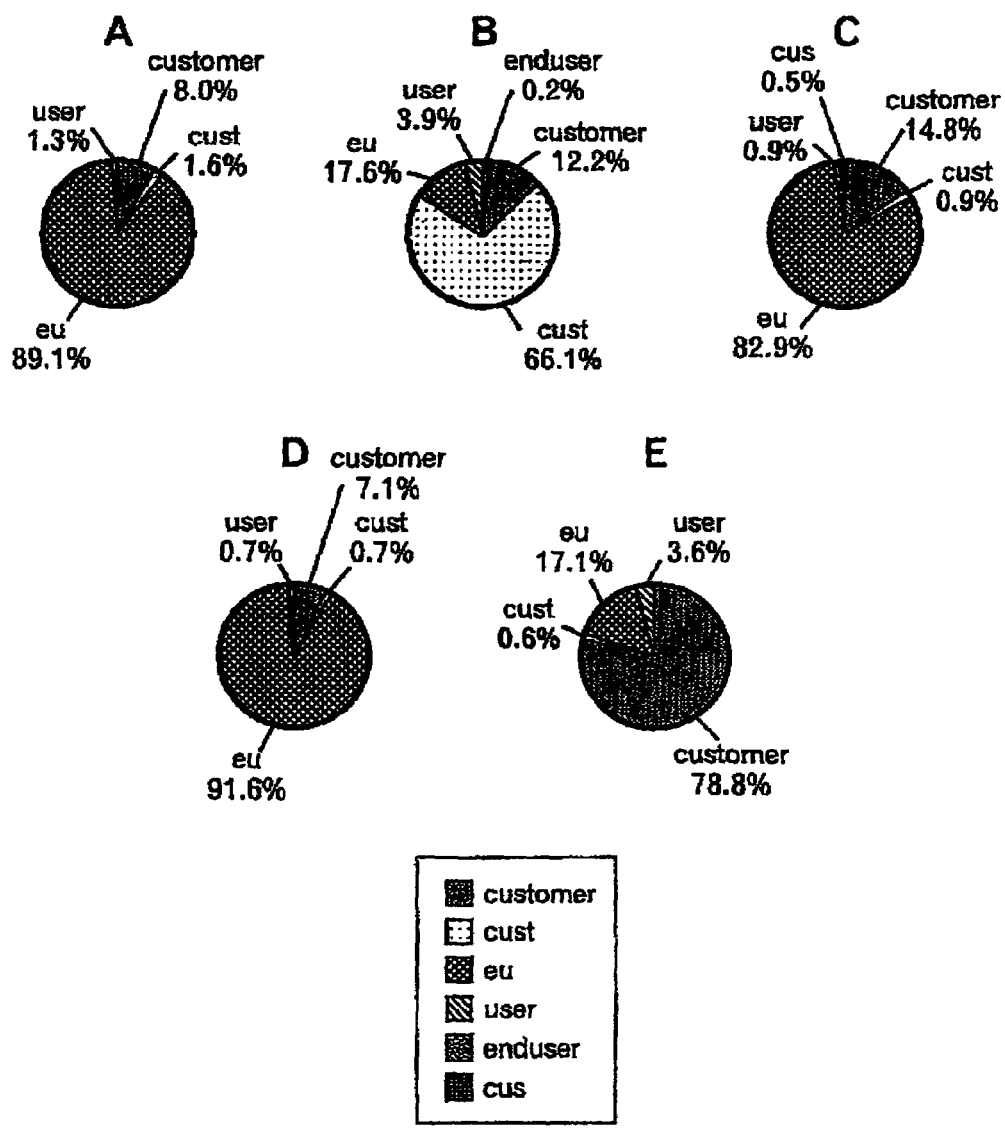
FIG. 1 shows graphs in which how the concept of "customer" is written is analyzed for each person in conversation recording documents created by a plurality of call takers (writers) in a call center.
Figure 2:
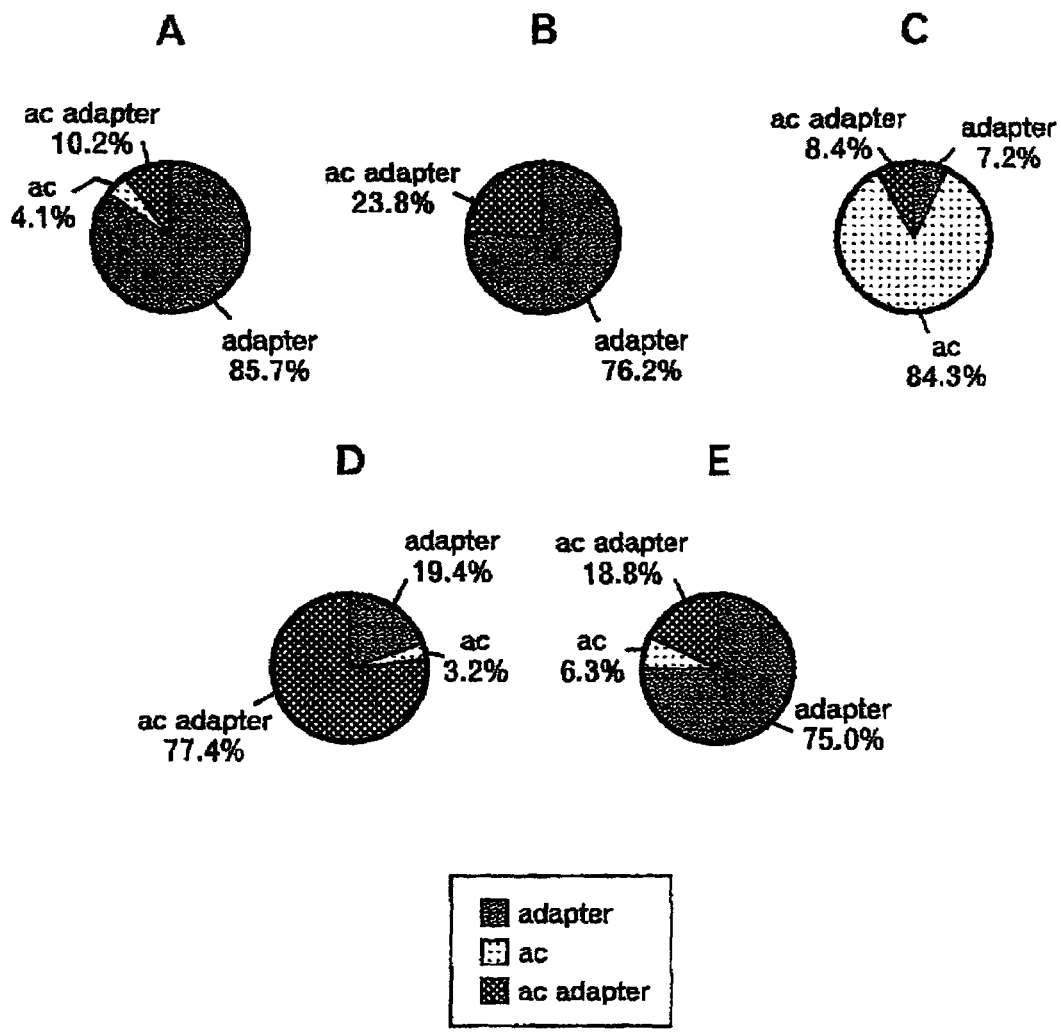
FIG. 2 shows graphs of the result obtained by performing similar analysis to that of FIG. 1 on the concept of "AC adapter."
Figure 3:
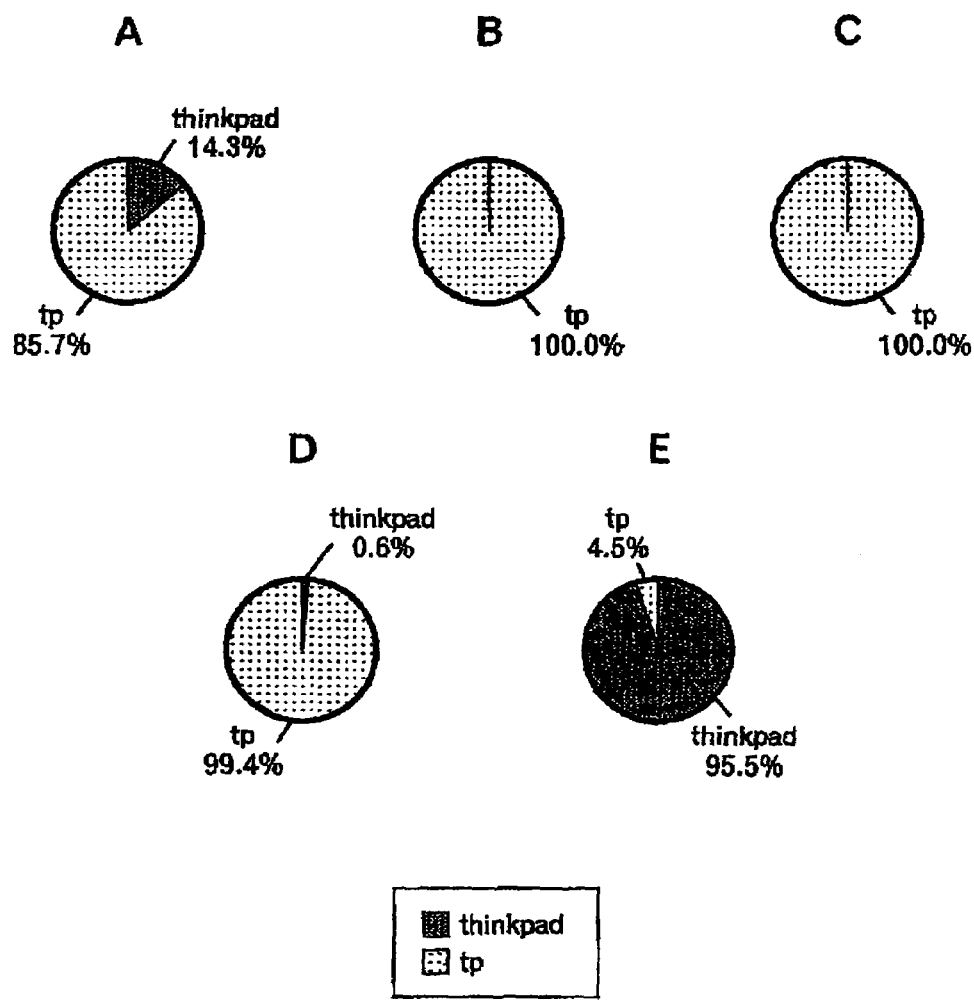
FIG. 3 shows graphs of the result obtained by performing similar analysis to that of FIG. 1 on the concept of "ThinkPad."
Figure 4:
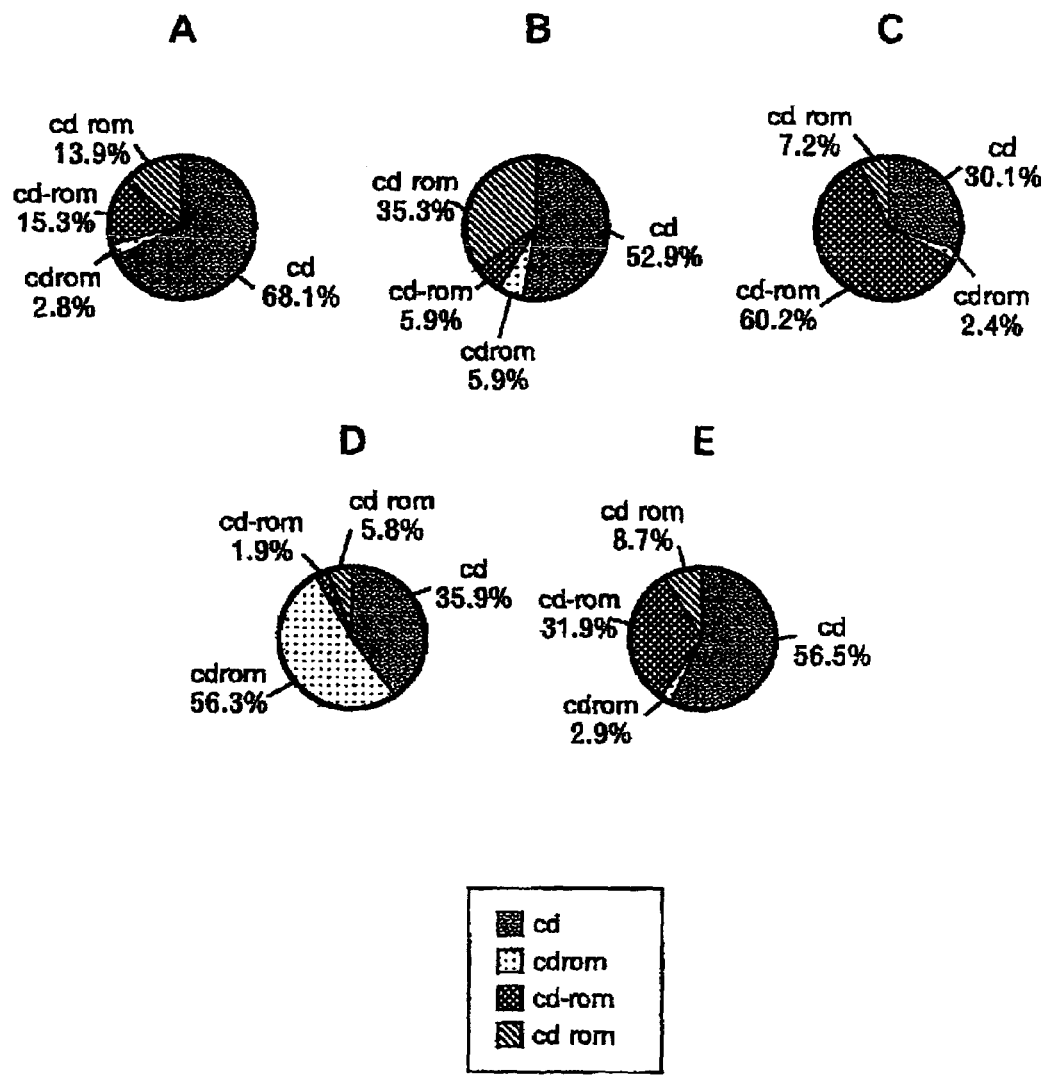
FIG. 4 shows graphs of the result obtained by performing similar analysis to that of FIG. 1 on the concept of "CD-ROM."
Figure 5:
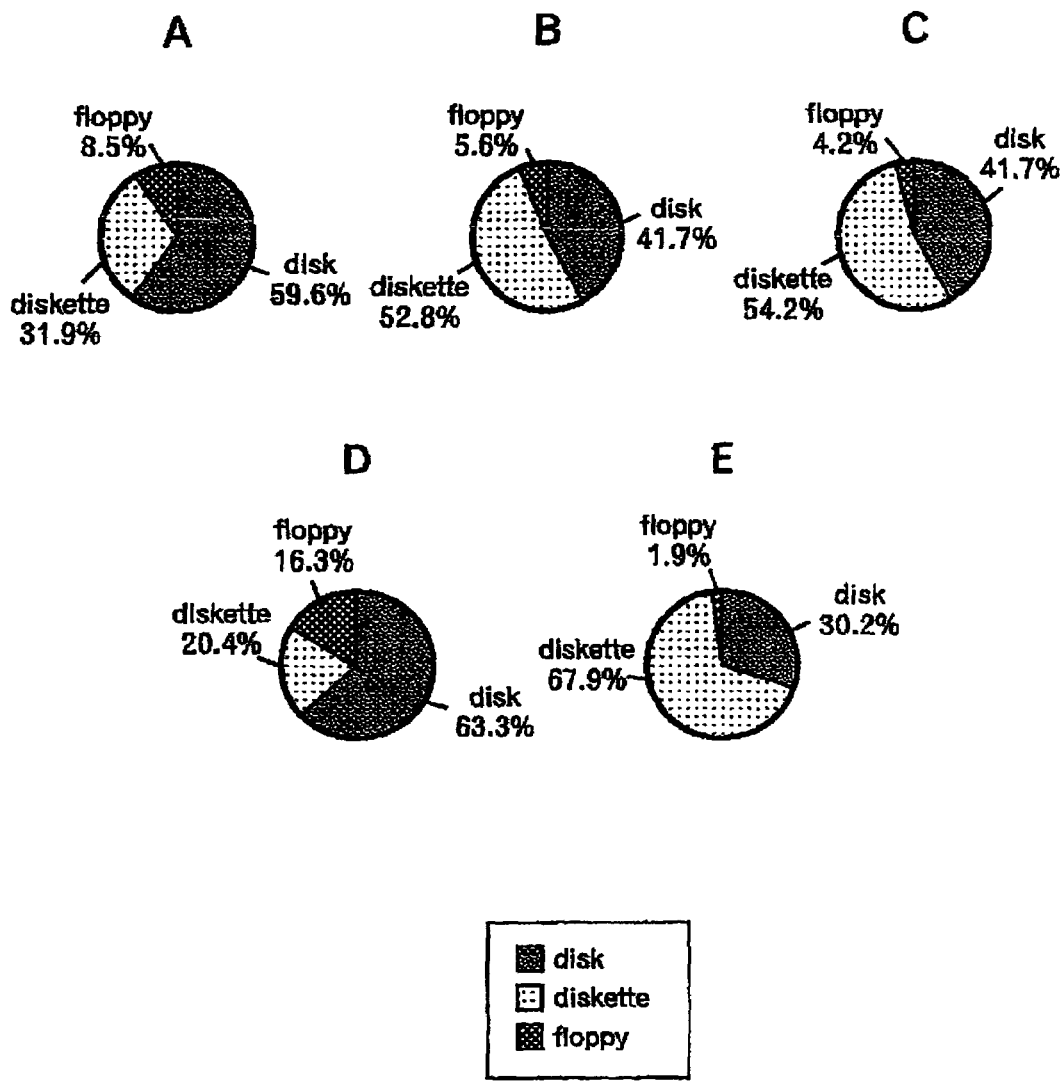
FIG. 5 shows graphs of the result obtained by performing similar analysis to that of FIG. 1 on the concept of "floppy disk."

Hereinafter, an embodiment of the present invention will be described in detail based on the drawings. However, the present invention can be carried out in a large number of different modes, and should not be construed as being limited to the contents described in the present embodiment. Note that, through the whole embodiment, the same components are denoted by the same reference numerals.

A method or system to be described in the embodiment below can be carried out as a program usable in a computer, as will be apparent to those skilled in the art. Therefore, the present invention can take a mode in which it is carried out as hardware, software, or a combination of software and hardware. The program can be recorded on an arbitrary computer-readable medium such as a hard disk drive, a CD-ROM, an optical storage, or a magnetic storage.

Moreover, in the embodiment below, a general computer system can be used as the system. A computer system usable in the embodiment has hardware resources included in a general computer system. Specifically, the hardware resources include a central processing unit (CPU), a main memory (RAM), a nonvolatile memory (ROM), a coprocessor, an image accelerator, a cache memory, an input/output (I/O) controller, an external memory such as a hard disk drive, and the like. Further, the computer system may have communication means connectable to a network such as the Internet. The computer system includes various computers, such as a personal computer, a workstation, and a main frame computer.

Before the embodiment will be described below, a feature of documents used in the present embodiment will be described. FIG. 1 shows graphs in which how the concept of "customer" is written is analyzed for each person in conversation recording documents created by a plurality of call takers (writers) in a call center. The indices A to E represent persons (call takers), and the frequency of each notation for each person is shown in percentage. Through all the documents, six notations "customer," "cust," "eu," "user," "enduser," and "cus" are used as words representing the concept of "customer". Among these, the person A writes "customer," "cust," "eu," or "user." Among these, "eu" shows the highest percentage, 89.1%. The percentage in which the person A uses the other notations is approximately 11%. That is, the person A writes the concept of "customer" mainly as "eu". The person B writes "enduser," "customer," "cust," "eu," or "user."

Among these, "cust" shows the highest percentage, 66.1%. Similarly, for the person C, "eu" shows the highest percentage, approximately 83%; for the person D, "eu" also shows the highest percentage, approximately 92%; and for the person E, "customer" shows the highest percentage, approximately 79%. That is, when the concept of "customer" is written, each person almost always uses specific notations, and the number of types of specific notations is almost limited to one. FIGS. 2 to 5 are graphs showing the results obtained by performing similar analysis to that of FIG. 1 on the respective concept of "AC adapter," "ThinkPad," "CD-ROM," and "floppy disk." Similar to the case of "customer," from FIG. 2, it can be seen that the person A writes the concept of "AC adapter" mainly as "adapter," the person B also writes it mainly as "adapter," the person C writes it mainly as "ac," the person D writes it mainly as "ac adapter," and the person E writes it mainly as "adapter." From FIG. 3, it can be seen that the persons A to D writes the concept of "Thinkpad" as "tp," and the person E writes it as "thinkpad." From FIG. 4, it can be seen that the person A writes the concept of "CD-ROM" mainly as "cd," the person B also writes it mainly as "cd," the person C writes it mainly as "cd-rom," the person D writes it mainly as "cdrom," and the person E writes it mainly as "cd." From FIG. 5, it can be seen that the person A writes the concept of "floppy disk" mainly as "disk," the person B writes it mainly as "diskette" or "disk," the person C also writes it mainly as "diskette" or "disk," the person D writes it mainly as "disk," and the person E writes it mainly as "diskette." Note that "ThinkPad" is a trademark of IBM Corporation and the name of a notebook personal computer.

That is, the analyses of FIGS. 1 to 5 tell the following fact. Specifically, in documents created by a plurality of persons, a given concept is not represented with a unified notation, but a plurality of notations exist in the documents. Meanwhile, if the documents are checked by being divided for each person, when each person writes a given concept, the person mainly uses a notation unique to the person but rarely uses other notations. If such a feature of the documents is utilized, the accuracy of generating candidate synonyms can be improved as follows. Specifically, since a given concept in the documents is represented with a plurality of notations, these notations 4 need to be represented by a unified index word. If candidate synonyms are generated for each person, the candidate synonyms must be generated in the state where the unique notation used by the person is ranked first (i.e., has the highest degree of relatedness). On the other hand, even when the candidate synonyms are generated for each person, noises must be included similarly to the case where all documents are the objects. Accordingly, candidate synonyms are generated for the documents classified for each person, and the words except the candidate synonym ranked first are estimated to be noises because the candidate synonym ranked first is estimated to be at least a notation unique to the person for a given concept (input object word), whereby the candidate synonyms matching the words estimated to be noises are deleted from the candidate synonyms for all the documents. Thus, the accuracy (ratio of correct answers) of generating candidate synonyms can be improved. Incidentally, the words ranked second and lower in the candidate synonym set for each person also have high probabilities of properly representing the concept of the object word unless the person uses a unified notation. In practice, as shown in FIGS. 1 to 5, since each person represents a given concept with a plurality of notations, the candidate synonyms ranked second and lower for each person also have high possibilities of being correct answers. In order to prevent the deletion of the proper notations, the candidate synonyms ranked first for other person are regarded as proper ones and are not deleted even if the candidate synonyms are ranked second or lower.

The present invention is intended to improve the accuracy of generating candidate synonyms, by taking advantage of the above-described feature of documents for each person. Hereinafter, a data processing system and a data processing method, which are concrete realization means, will be described.

Figure 6:
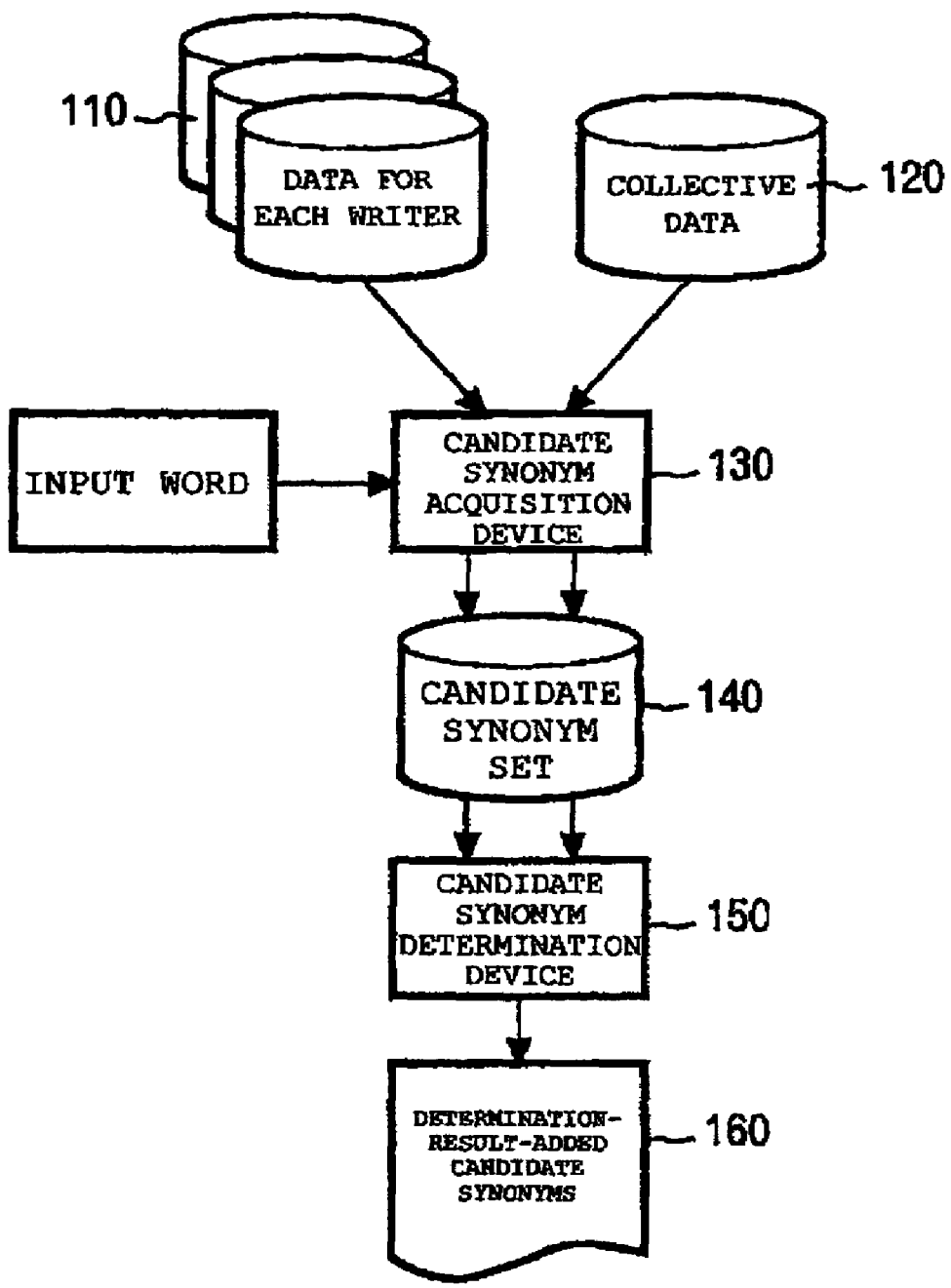
FIG. 6 is a block diagram showing the functions of an example of a data processing system which is an embodiment of the present invention.

FIG. 6 is a block diagram showing the functions of an example of the data processing system, which is an embodiment of the present invention. The data processing system of the present embodiment includes data 110 for each writer, collective data 120, a candidate synonym acquisition device 130, a candidate synonym set 140, a candidate synonym determination device 150, determination-result-added candidate synonyms 160. The data 110 for each writer is a database in which nouns generated from document data for each writer; words including verbs, adjectives, adjectival verbals, and the like which cooccur with the nouns; and dependency structures between the nouns and the words are represented as verb-noun pairs. The collective data 120 is a database in which nouns generated from the whole of document data containing documents by all writers; words including verbs, adjectives, adjectival verbals, and the like which cooccur with the nouns; and dependency structures between the nouns and the words are represented as verb-noun pairs. The candidate synonym acquisition device 130 receives an object word for generating synonyms as an input word, and generates the candidate synonym set 140 of the input word, from the data 110 for each writer and the collective data 120. That is, the candidate synonym acquisition device 130 generates a candidate synonym set for each writer from the data 110 for each writer, and generates a candidate synonym set for the collective data from the collective data 120. The candidate synonym set 140 includes the candidate synonym sets for the respective writer and the candidate synonym set for the collective data, which have been generated by the candidate synonym acquisition device 130. If there are m writers, the number of candidate synonym sets recorded in the candidate synonym set 140 is m+1. Using the candidate synonym set 140 as input, the candidate synonym determination device 150 evaluates the candidate synonym set acquired from the collective data, based on the candidate synonym sets for the respective writers. In the evaluation, the candidate synonyms acquired from the collective data are determined whether the candidate synonyms are appropriate candidates for synonyms or not. The determination result is outputted as the determination-result-added candidate synonyms 160.

The data 110 for each writer and the collective data 120 are generated as follows. First, an object word (input word), which is a word desired to be examined, is set as a base word b. The entire data is denoted by a suffix of F, and the writers of the corpus are denoted by suffixes of A, B, C, .... Note that A, B, C, ... are in descending order of the amount of data. The number of nouns appearing in the entire data is set to n, and the number of verbs and the like (verbs, adjectives, adjectival verbals, and the like) is set to m. For each noun, which verbs and the like the noun has modification relations with is represented by a matrix. When the modification relation between a noun p and a verb q appears k times in data, an element $i_{pq}$ of the matrix is represented as Equation 1.

$$i_{(pq)} = k$$ [Equation 1]

The matrices obtained from the respective sets are $M_{(F)}$, $M_{(A)}$, $M_{(B)}$, $M_{(C)}$, ..., each of which has a size of n by m. The matrices $M_{(F)}$ and the like are represented as Equation 2.

$$M_{(F,A,B,C,...)} = \begin{pmatrix} i_{11} & i_{12} & \cdots & i_{1m} \\ i_{21} & \ddots & & \vdots \\ \vdots & & \ddots & \vdots \\ i_{n1} & \cdots & \cdots & i_{nm} \end{pmatrix}$$ [Equation 2]

The data 110 for each writer is represented as, for example, $M_{(A)}$, $M_{(B)}$, $M_{(C)}$, ..., and the collective data 120 can be represented as $M_{(F)}$. To identify which verbs a noun $N_{(P)}$ has modification relations with, the p-th row in the matrix M is extracted as a vector. The vector thus obtained can be represented as Equation 3.

$$N_{(p)} = (p_1, p_2, \ldots p_m)$$ [Equation 3]

Next, the operation of the candidate synonym acquisition device 130 of FIG. 7 will be described. The candidate synonym acquisition device 130 is realized as software in the computer system. First, information on the base word b, which is the input word, in the universal set is found. The verb information vector $N_{(b)}$ of the base word b, which is represented by Equation 4, is found from $M_{(F)}$.

$$N_{(b)} = (b_1, b_2, \ldots b_m)$$ [Equation 4]

The angle between this and the verb information vector $N_{(i)}$ which is possessed by each noun in M(F) is set to θ. It can be considered that, as the angle θ becomes smaller, that is, as the value of cos θ approaches one, the noun has a meaning closer to that of the base word. Accordingly, the value of cos θ can be set as the degree of relatedness. That is, the degree of relatedness is represented by a value from zero to one and becomes large as the value approaches one (becomes large). Note that the value of cos θ can be found by utilizing the scalar product value of $N_{(b)}$ and $N_{(i)}$.

$$N_{(i)} = (i_1, i_2, \ldots i_m)$$ [Equation 5]

Ranking is performed in descending order of the degree of relatedness found as described above. The set of nouns ranked from first place to a predetermined place is set to $C_{(F)}$. This $C_{(F)}$ is the candidate synonym set for the collective data.

Next, the case where the candidate synonym set for each writer is acquired from the data 110 for each writer will be described. Using the verb information vector $N_{(b)}$ for the base word b, which is described by the aforementioned Equation 4, ranking is performed on the nouns which have meanings closer to that of the base word b among the nouns for each writer. The candidate synonym set for the writer A is set to $C_{(A)}$. Here, the verb information vector for the noun b in $M_{(A)}$, which is the data for each writer, is not used. This is because when a writer writes a noun synonymous with b, the notation thereof may be different from b. If so, the elements of the verb information vector for the noun b in the data for each writer are almost zero, and the use of this has a less possibility of properly acquiring nouns having meanings closer to that of b. Therefore, the verb information vector for the noun b in the collective data is used. Similarly, for a predetermined number of writers B, C, D, ..., the candidate synonyms $C_{(B)}$, $C_{(C)}$, $C_{(D)}$, ... can be also acquired.

Figure 7:
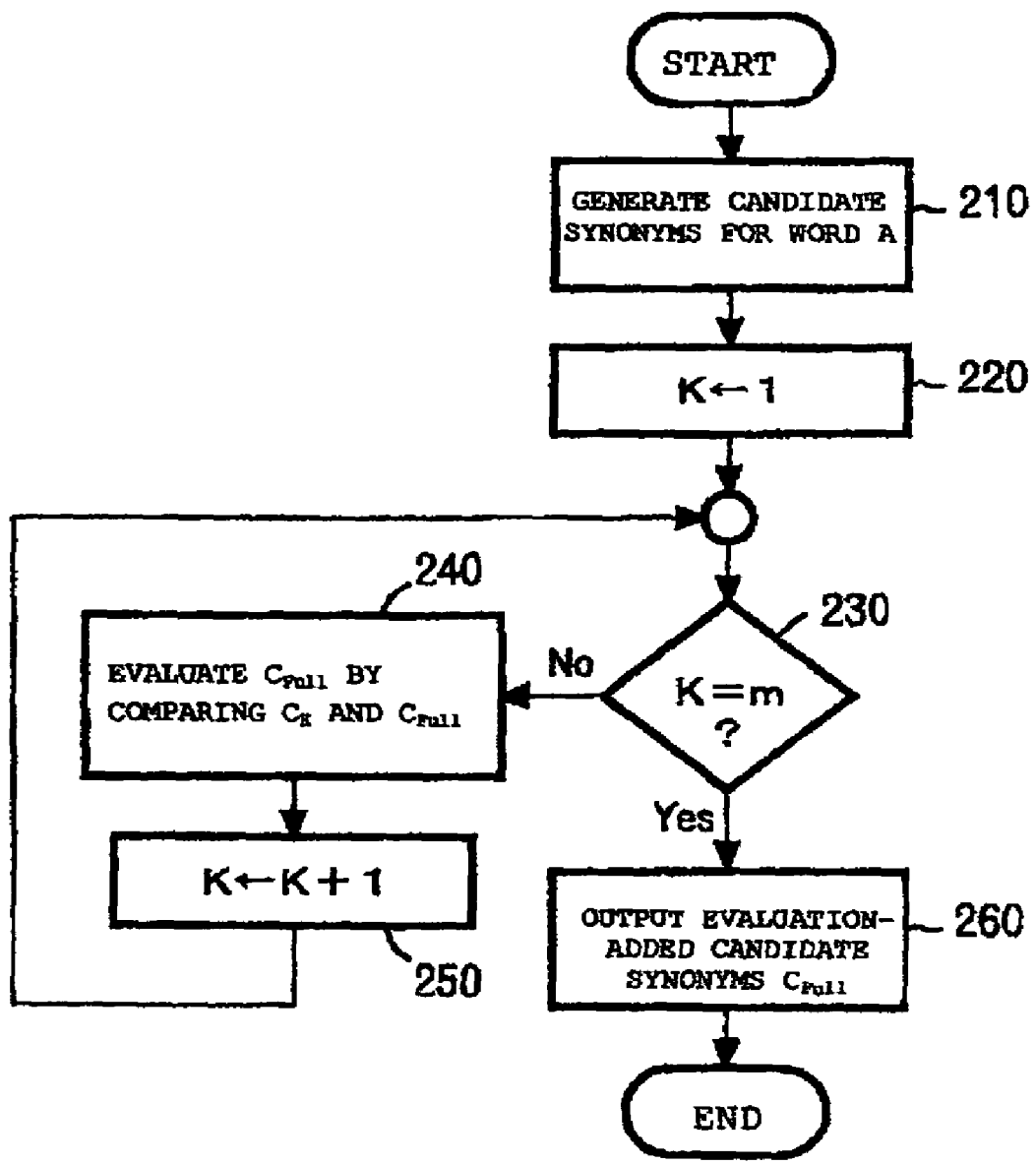
FIG. 7 is a flowchart showing an example of a data processing method which is an embodiment of the present invention.

FIG. 7 is a flowchart showing an example of the data processing method of the present embodiment. First, the candidate synonyms for the input word A (object word) are generated (Step 210). This candidate synonym set is generated by the aforementioned candidate synonym acquisition device 130, and the candidate synonym set $C_{Full} = C_{(F)}$ for the collective data and the candidate synonym set $C_k = \{C_{(A)}, C_{(B)}, C_{(C)}, C_{(D)}, \ldots\}$ (k=m, m is the number of writers) for the data for each writer are acquired. Table 1 is a table showing an example of the candidate synonym set $C_{Full}$ generated from the collective data for documents created in a call center.

TABLE 1

|  | Candidate | Degree of Relatedness |
|---|---|---|
| 1st | batt | 0.931822351 |
| 2nd | batterie | 0.715788329 |
| 3rd | bat | 0.710195438 |
| 4th | cover | 0.707797961 |
| 5th | BTY | 0.692943466 |
| 6th | batterry | 0.685881821 |
| 7th | adapter | 0.68556948 |
| 8th | bezel | 0.68310627 |
| 9th | cheque | 0.662869626 |
| 10th | screw | 0.660905914 |

Here, the input word is "battery," and words not included in the concept thereof are contained as candidates. "Cover" ranked fourth and "adapter," "bezel," "cheque," and "screw" ranked seventh and lower are noises.

Tables 2 and 3 are tables showing examples of the candidate synonym sets of "battery" which are generated from the data for each writer by the writers A and B, respectively.

TABLE 2

|      | Candidate in Writer A | Degree of Relatedness |
|------|-----------------------|-----------------------|
| 1st  | Battery               | 0.628668186           |
| 2nd  | controller            | 0.622998592           |
| 3rd  | Cover                 | 0.622998592           |
| 4th  | APM                   | 0.622998592           |
| 5th  | Screw                 | 0.622998592           |
| 6th  | Mark                  | 0.622998592           |
| 7th  | Cheque                | 0.608253852           |
| 8th  | diskette              | 0.552631893           |
| 9th  | checkmark             | 0.445188186           |
| 10th | Boot                  | 0.441109236           |

TABLE 3

|      | Candidate in Writer B | Degree of Relatedness |
|------|-----------------------|-----------------------|
| 1st  | battery               | 0.708152721           |
| 2nd  | Form                  | 0.622998592           |
| 3rd  | protector             | 0.622998592           |
| 4th  | DISKETTE              | 0.622998592           |
| 5th  | Mwave                 | 0.622998592           |
| 6th  | Adapter               | 0.618890929           |
| 7th  | Mouse                 | 0.476604906           |
| 8th  | Cheque                | 0.456842327           |
| 9th  | checkmark             | 0.442857358           |
| 10th | process               | 0.392258373           |

In both Tables 2 and 3, "battery" is ranked first. In this example, both the writers A and B use "battery" as a specific word representing the concept of "battery."

Next, one is substituted into a pointer variable K (Step 220), and whether K is equal to the number m of writers or not is determined (Step 230). If the determination in Step 230 is "no" (evaluation has not been finished for all writers), the evaluation of $C_{Full}$ is performed by comparing $C_k$ and $C_{Full}$ (Step 240).

Figure 8:
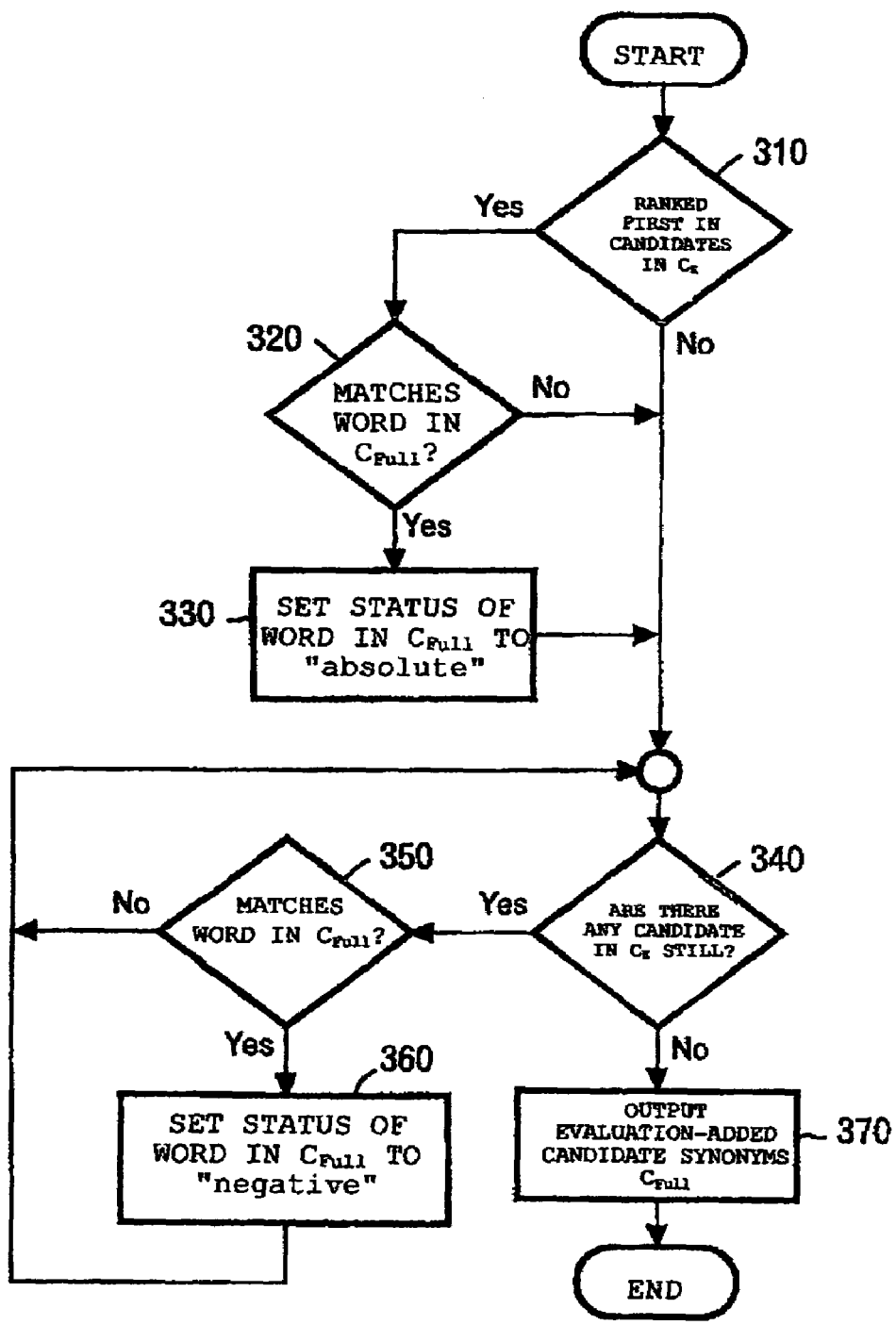
FIG. 8 is a flowchart showing an example of an evaluation procedure (Step 240) for $C_{Full}$.

FIG. 8 is a flowchart showing an example of the evaluation procedure (Step 240) for $C_{Full}$. First, whether an evaluation target word is ranked first among the candidates in $C_k$ or not is determined (Step 310). If the evaluation target word is ranked first, whether the evaluation target word matches a word in $C_{Full}$ or not is determined (Step 320). If the evaluation target word matches a word in $C_{Full}$, the status of the word in $C_{Full}$ is set to "absolute" (Step 330). Here, "absolute" means "definitive as a candidate synonym," and does not become "negative" according to later evaluation. Moreover, even if a word has been already evaluated to be "negative," the status can be changed into "absolute."

When the determinations in Steps 310 and 320 are "no", after Step 330 is performed, the processing proceeds to Step 340, and whether there is still any candidate in $C_k$ or not is determined (Step 340). If there is any candidate, whether the candidate matches a word in $C_{Full}$ or not is determined (Step 350). If the candidate matches a word in $C_{Full}$, the status of the matched word in $C_{Full}$ is set to "negative" (Step 360). However, the status can be set to "negative" only for candidate synonyms which have not been evaluated to be "absolute" yet. If the candidate does not match any word in $C_{Full}$, the processing goes back to Step 340. Steps 340 to 360 are performed until no candidate in $C_k$ remains.

When the determination in Step 340 is "no", evaluation-added candidate synonyms $C_{Full}$ are outputted (Step 370).

When $C_{Full}$ of the aforementioned Table 1 is evaluated with $C_k$ of the aforementioned Table 2 using the above-described procedure, "cover" ranked third in Table 2 matches "cover" ranked fourth in Table 1 and is, therefore, given the status of "negative." Similarly, "screw" ranked tenth and "cheque" ranked ninth in Table 1 are given the status of "negative." Thus, using the candidate synonyms for a given writer, the candidate synonym set for the collective data can be evaluated.

Thereafter, the pointer K is incremented by one (Step 250), and the processing goes back to Step 230. Then, similar to the aforementioned evaluation, evaluation is also performed on the other writer. When $C_{Full}$ of Table 1 is evaluated with $C_k$ of the aforementioned Table 3 using the aforementioned procedure, "adapter" ranked seventh and "cheque" ranked ninth in Table 1 are given the status of "negative."

After evaluation has been performed on all writers, the determination in Step 230 becomes "yes", the evaluation-added candidate synonyms $C_{Full}$ are outputted (Step 260), and the processing is terminated.

As a result of performing the above-described processing on $C_{Full}$ of Table 1, the status of "negative" is given to "cover" ranked fourth, "adapter" ranked seventh, "cheque" ranked ninth, and "screw" ranked tenth. The result is provided to a user by a GUI or the like after the status is added to the result or the words having the status of "negative" are deleted from the result. The user can confirm the provided contents to define candidate synonyms for the concept of "battery," in the case of the aforementioned example. Note that the noise "bezel," which cannot be removed, remains even in this phase. The user can delete "bezel" in this phase to generate a thesaurus for the concept of "battery."

Here, the generated thesaurus contains abbreviations and misspellings, such as "batt," "batterie," "bat," "BTY," and "battery." If the system and method of the present embodiment are used, candidate synonyms are generated using, as a corpus, documents to which text mining is actually applied. Accordingly, even such abbreviations and misspellings can be included in synonyms. This makes it possible to effectively utilize information which has been discarded as noises in a conventional thesaurus or the like. Text mining using a thesaurus according to the present embodiment enables more correct and accurate analysis of documents. Moreover, according to the system or method of the present embodiment, since a low-cost and effective thesaurus can be created, the introduction of text mining can be made easy. Further, for data of a call center and various reports, which are large application fields of text mining, a large amount of data of which writers are known is stocked. Therefore, the method of the present embodiment for creating a thesaurus has high feasibility and is effective.

Moreover, in the case where sentences are created using a template or the like, the template parts can be deleted to generate the collective data 120 or the data 110 for each person. Thus, the differences between persons can be made more noticeable.

Furthermore, frequencies of nouns can be taken into consideration. There are cases where a transaction like a conversation between a customer and an operator in a call center occurs, for example. In the case where an operator has handled a trouble of a product (e.g., a hard disk drive or the like) and the conversation therefor has prolonged, the appearance of a specific word (e.g., a hard disk drive) is more frequent than that in other documents. However, in the case where other operator has received the same inquiry but the question has been finished briefly, the frequency of the word becomes low. In order to eliminate such a bias in the frequency of a word, more accurate synonyms can be obtained by normalizing the frequencies of words for each transaction (or each document). Note that the normalization can be adopted in order to absorb variations in notation due to writing errors of writers and the passage of time.

In addition, in the synonyms obtained as described previously, which synonym is a correct answer (which word is general when words are integrated into one unified notation) must be determined by humans. Consequently, a correct answer can be automatically obtained by applying a similar method to a document (e.g., a computer manual in the case of the computer field) which is in the same field and in which notation is unified into general words. In a document, such as a computer manual, which has been created relatively accurately, representations are unified, and the representations are frequently used in general among the synonyms thereof. Therefore, using the verb information vectors of obtained synonyms, a word to be an appropriate label for subsequent sets can be selected.

Moreover, it has been proved that the accuracy of synonyms becomes high in the case where a generally used representation as described above is selected as an input noun when the synonyms are created, compared to the case where a non-general abbreviation or the like is inputted. For example, the respective results when the candidate synonym generation of the present embodiment is performed on identical documents by selecting "customer," "cus," "cust," and "end_user" as input words are shown in FIGS. 4 to 7. Note that in each table, the candidates having "x" on the left sides thereof are noises.

TABLE 4

| | customer | |
|---|---|---|
| 1st | cust | 0.881 |
| 2nd | ˣtech | 0.849 |
| 3rd | Eu | 0.839 |
| 4th | eu | 0.81 |
| 5th | Cus | 0.809 |
| 6th | User | 0.796 |
| 7th | CUS | 0.796 |
| 8th | custoemr | 0.793 |
| 9th | EU | 0.781 |
| 10th | caller | 0.769 |

TABLE 5

| | Cus | |
|---|---|---|
| 1st | Cust | 0.975 |
| 2nd | Cst | 0.879 |
| 3rd | ˣtech | 0.847 |
| 4th | csut | 0.829 |
| 5th | customer | 0.809 |
| 6th | ˣtaht | 0.762 |
| 7th | eu | 0.742 |
| 8th | ˣlady | 0.725 |
| 9th | ˣAuth_Serv | 0.724 |
| 10th | Customer | 0.721 |

TABLE 6

| | Cust | |
|---|---|---|
| 1st | Cus | 0.975 |
| 2nd | Customer | 0.881 |
| 3rd | ˣtech | 0.878 |
| 4th | cst | 0.86 |
| 5th | eu | 0.81 |
| 6th | Csut | 0.793 |
| 7th | ˣthat | 0.777 |
| 8th | custoemr | 0.768 |
| 9th | ˣJason | 0.736 |
| 10th | CUS | 0.726 |

TABLE 7

| | end_user | |
|---|---|---|
| 1st | Caller | 0.779 |
| 2nd | CUst | 0.753 |
| 3rd | Cus | 0.753 |
| 4th | CUs | 0.736 |
| 5th | customer | 0.719 |
| 6th | Cust | 0.711 |
| 7th | ˣthanks | 0.708 |
| 8th | ˣrecieving | 0.707 |
| 9th | Eu | 0.701 |
| 10th | user | 0.698 |

Table 4 is the result of generating candidate synonyms when "customer" is selected as the input word, and the ratio of correct answers is 0.9. Table 5 is the result of generating candidate synonyms when "cus" is selected as the input word, and the ratio of correct answers is 0.6. Table 6 is the result of generating candidate synonyms when "cust" is selected as the input word, and the ratio of correct answers is 0.7. Table 7 is the result of generating candidate synonyms when "end_user" is selected as the input word, and the ratio of correct answers is 0.8. As described above, the ratio of correct answers is highest when "customer," which is a general term, is selected as the input word (object word). Therefore, a more effective result can be obtained by selecting the input noun from a manual or the like.

The text mining system described in the aforementioned Tetsuya Nasukawa, Masayuki Morohashi, and Tohru Nagano, "Text Mining—Discovering Knowledge in Vast Amounts of Textual Data—," Magazine of Information Processing Society of Japan, Vol. 40, No. 4, pp. 358-364 (1999)., synonyms are absorbed using category dictionaries, each of which has been created for each field. However, these category dictionaries must be created by humans who understand the fields. Therefore, a lower-cost method for creating dictionaries is desired. On the other hand, in data of a call center and various reports, which are large application fields of text mining, a large amount of data of which writers are known is stocked. Accordingly, using the means of the present embodiment, the generation of a dictionary can be supported efficiently.

Moreover, according to the method of the present embodiment, candidate synonyms can be obtained even for technical terms and special-purpose words. Further, even for new words not given in dictionaries, synonyms including misspellings, and words in the same category can be found.

Furthermore, the method of the present embodiment is also effective in retrieving candidate synonyms limited to a relevant field from a specific document. For example, synonyms of a technical term in a specific field can be dynamically extracted using not an existing thesaurus but a document in the specific field. Also in the case where text mining is performed on records of a call center, development is significant in the computer field, and therefore the pace at which the number of technical terms increases is rapid. In particular, it is considered that many questions about information on new products are received. Therefore, it is considered that the use of only existing thesauruses is insufficient. Accordingly, if the method of the present embodiment is used when sufficient documents in a specific field exist, newly found words not given in dictionaries can be also verified for the synonymity with existing words, and can be newly added to a thesaurus.

As described above, though the invention achieved by the present inventors has been concretely described based on the embodiment of the invention, the present invention is not limited to the embodiment and can be variously modified without departing from the scope thereof.

For example, in the aforementioned embodiment, the accuracy of generating candidate synonyms is improved by utilizing the feature of documents which are different for each person. Other than this, in the case where there are documents in which a given concept is identified or estimated to be represented as a specific synonym, of course, these documents may be used as partial data.

Moreover, in the aforementioned embodiment, when the candidate synonyms for the collective data are evaluated with the candidate synonym set for each writer, the candidate synonyms are separated into first place and second place and lower, and evaluated to be "absolute" or "negative." However, for example, the threshold value place may be changed so that second place and higher are evaluated to be "absolute" and that third place and lower are evaluated to be "negative."

INDUSTRIAL APPLICABILITY

Effects obtained by the representative inventions among the inventions disclosed in the present application are as follows. Specifically, it is possible to provide a support system or a method for generating candidate synonyms, in which candidate synonyms can be generated efficiently when a thesaurus usable in text mining is created. Moreover, in generating the candidate synonyms, by using a document to which text mining is actually applied, it is possible to handle words including abbreviations and peculiar terms used in the document, and even misspelled or misconverted words. Furthermore, by using the present invention with a system for text mining, an optimum thesaurus for a document to which the thesaurus is to be applied can be dynamically generated to realize more accurate document analysis.

While our invention has been described with respect to certain preferred embodiments and exemplifications, it is not intended to limit the scope of the invention thereby, but solely by the claims appended hereto.

The invention claimed is:

1. A data processing method based on collective document data containing sentences by different writers for generating a candidate synonym for an object word used in the document data, the data processing method comprising the steps of:

inputting the object word as a concept for candidate synonyms;

generating at least one piece of partial data of the collective document data for a writer, the partial data containing only the sentences by the writer;

extracting words contained in the collective document data based on the object word by calculating degrees of relatedness between the extracted words and the object word, and generating a first set of candidate synonyms, which has as elements for the first set, a predetermined number of the extracted words ranked highest in descending order of the degree of relatedness;

extracting words contained in the partial data based on the object word by calculating degrees of relatedness between the extracted words in the partial data and the object word, and generating a second set of candidate synonyms for the writer, which has as elements for the second set, a predetermined number of the extracted words ranked highest in descending order of the degree of relatedness;

evaluating, among the words contained in the first set of candidate synonyms, the words of the first set, which are matched with the words ranked in places equal to or higher than a threshold value place in any of the second sets of candidate synonyms, are evaluated to be absolute, wherein said absolute, is a definitive candidate synonym;

evaluating, among the words contained in the first set of candidate synonyms except the words evaluated to be absolute, the words of the first set, which are matched with the words ranked in places lower than the threshold value place in any of the second sets of candidate synonyms, are evaluated to be negative, wherein said negative is not a definitive candidate synonym; and generating the candidate synonyms for the object word from the words of the first set of candidate synonyms by excluding the words evaluated to be negative, wherein the calculation of the degrees of relatedness is realized by the steps of:

extracting all words of a first word class and all words of a second word class from the document data or the partial data, the words of the second word class having modification relations with the words of the first word class;

generating a matrix using all the extracted words of the first word class and all the extracted words of the second class as indices of rows or columns thereof, the matrix having a size of the number of the words of the first word class by the number of the words of the second word class;

substituting a frequency of the modification relation between the word of the first word class and the word of the second word class with elements for the matrix and indexing each element of the elements into the matrix;

extracting said each element of the elements of the row or column having the word of the first word class matching the object word from the matrix generated based on the document data to set the row or column as an object word vector;

extracting each element of the elements of an arbitrary row or an arbitrary column from the matrix generated based on the document data or the partial data;

setting the row or column as a vector of the word of the first word class indicated by the row or column; and calculating a degree of relatedness of the word of the first word class with the object word by taking a scalar product of the vector of the word of the first word class and the object word vector.

2. The data processing method according to claim 1, wherein the threshold value place is a first place.

3. The data processing method according to claim 1, wherein the words of the first word class are nouns, and the words of the second word class are verbs, adjectives, adjectival verbals, and others which have the modification relations with the nouns.

4. The data processing method according to claim 1, further comprising the step of deleting a part created using the document template from the document data or the partial data, if the part created using a document template is contained in the document data or the partial data, deleting the part created using the document template from the document data or the partial data.

5. The data processing method according to claim 1, further comprising the step of normalizing frequencies of the words for each sentence or each document, if a series of sentences or documents about same or similar topics is contained in the document data or the partial data.

6. The data processing method according to claim 1, further comprising the step of removing the noun from objects of the calculation of the degrees of relatedness, if the frequency of a noun appearing in the document data or the partial data is lower than a predetermined frequency.

7. A data processing system comprising:
a central processing unit and memory;
means for inputting an object word as a concept for candidate synonyms;
means for inputting collective document data containing sentences by different writers and at least one piece of partial data for a writer, the partial data containing only the sentences by the writer;
means for extracting words contained in the collective document data and calculating the degrees of relatedness between the extracted words of the collective document data and the object word contained in the collective document data;
means for extracting words contained in the partial data, and calculating the degrees of relatedness between the extracted words of the partial data and the object word contained in the collective document data;
means for generating a set of candidate synonyms, which has as elements, a predetermined number of the extracted words ranked highest in descending order of the degrees of relatedness;
means for recording a first set generated by the candidate synonyms generating means based on the collective document data and a second set for the writer, the second set being generated by the candidate synonyms generating means based on the partial data;
means for evaluating, among words contained in the first set, the words of the first set, which are matched with the words ranked in places equal to or higher than a threshold value place in any of the second sets, are evaluated to be absolute, wherein said absolute is a definitive candidate synonym; and
evaluating, among the words contained in the first set except the words evaluated to be absolute, the words of the first set, which are matched with the words ranked in places lower than the threshold place in any of the second sets, are evaluated to be negative, wherein said negative is not a definitive candidate synonym; and
means for generating candidate synonyms for the object word from the words of the first set of candidate synonyms by excluding the words evaluated to be negative,
wherein the means for calculating the degrees of relatedness comprises:
means for extracting all words of a first word class and all words of a second word class from the document data or the partial data, the words of the second word class having modification relations with the words of the first word class;
means for generating a matrix using all the extracted words of the first word class and all the extracted words of the second class as indices of rows or columns thereof, the matrix having a size of the number of the words of the first word class by the number of the words of the second word class;
means for substituting a frequency of the modification relation between the word of the first word class and the word of the second word class with elements for the matrix and indexing each element of the elements into the matrix;
means for extracting each element of the elements of the row having the word of the first word class matching the object word from the matrix generated based on the document data to set the row as an object word vector;
means for extracting each element of the elements of an arbitrary row from the matrix generated based on the document data or the partial data to set the row as a vector of the word of the first word class indicated by the row; and
means for calculating a degree of relatedness of the word of the first word class with the object word by taking a scalar product of the vector of the word of the first word class and the object word vector.

8. The data processing system according to claim 7, wherein the threshold value place is a first place.

9. The data processing system according to claim 7, wherein the words of the first word class are nouns, and the words of the second word class are verbs, adjectives, adjectival verbals, and others which have the modification relations with the nouns.

10. The data processing system according to claim 7, further comprising means for deleting a part created using the document template from the document data or the partial data, if the part created using a document template is contained in the document data or the partial data.

11. The data processing system according to claim 7, further comprising means for normalizing frequencies of the words for each sentence or each document, if a series of sentences or documents about same or similar topics is contained in the document data or the partial data.

12. The data processing system according to claim 7, further comprising means for removing a noun from objects of the calculation of the degrees of relatedness, if the frequency of the noun appearing in the document data or the partial data is lower than a predetermined frequency.

13. A computer-readable storage medium storing a computer executable program for causing a computer to generate a candidate synonym for an object word used in collective document data based on the document data containing sentences by different writers, the computer-readable storage medium storing the computer executable program when executed by a computer processing unit provides the functions of:
inputting the object word as a concept for candidate synonyms;
generating at least one piece of partial data of the collective document data for a writer, the partial data containing only the sentences by the writer;
extracting words contained in the collective document data based on the object word by calculating degrees of relatedness between the extracted words in the collective data and the object word, and generating a first set of candidate synonyms, which has as elements for the first set, a predetermined number of the extracted words ranked highest in descending order of the degree of relatedness;

extracting words contained in the partial data based on the object word by, calculating degrees of relatedness between the extracted words in the partial data and the object word, and generating a second set of candidate synonyms, which has elements for the second set, a predetermined number of the extracted words ranked highest in descending order of the degree of relatedness for the writer;

evaluating, among the words contained in the first set of candidate synonyms, the words of the first set, which are matched with the words ranked in places equal to or higher than a threshold value place in any of the second sets of candidate synonyms, are evaluated to be absolute, wherein said absolute is a definitive candidate synonym;

evaluating, among the words contained in the first set of candidate synonyms except the words evaluated to be absolute, the words of the first set, which are matched with the words ranked in places lower than the threshold value place in any of the second sets, are evaluated to be negative, wherein said negative is not a definitive candidate synonym; and generating the candidate synonyms for the object word from the words of the first set of the candidate synonyms by excluding the words evaluated to be negative, wherein the means for calculating the degrees of relatedness comprises:

means for extracting all words of a first word class and all words of a second word class from the document data or the partial data, the words of the second word class having modification relations with the words of the first word class;

means for generating a matrix using all the extracted words of the first word class and all the extracted words of the second class as indices of rows or columns thereof, the matrix having a size of the number of the words of the first word class by the number of the words of the second word class;

means for substituting a frequency of the modification relation between the word of the first word class and the word of the second word class with elements for the matrix and indexing each element of the elements into the matrix;

means for extracting each element of the elements of the row having the word of the first word class matching the object word from the matrix generated based on the document data to set the row as an object word vector;

means for extracting each element of the elements of an arbitrary row from the matrix generated based on the document data or the partial data to set the row as a vector of the word of the first word class indicated by the row; and means for calculating a degree of relatedness of the word of the first word class with the object word by taking a scalar product of the vector of the word of the first word class and the object word vector.

* * * * *